(12) United States Patent
Imatoh

(10) Patent No.: US 10,682,956 B2
(45) Date of Patent: Jun. 16, 2020

(54) IMAGE PROCESSING DEVICE

(71) Applicant: LAPIS Semiconductor Co., Ltd., Yokohama (JP)

(72) Inventor: Yuki Imatoh, Yokohama (JP)

(73) Assignee: LAPIS SEMICONDUCTOR CO., LTD., Yokohama (JP)

( * ) Notice: Subject to any disclaimer, the term of this patent is extended or adjusted under 35 U.S.C. 154(b) by 0 days.

(21) Appl. No.: 16/040,936

(22) Filed: Jul. 20, 2018

(65) Prior Publication Data
US 2019/0023182 A1   Jan. 24, 2019

(30) Foreign Application Priority Data
Jul. 24, 2017  (JP) ................. 2017-142768

(51) Int. Cl.
| | |
|---|---|
| *B60R 1/04* | (2006.01) |
| *B60R 11/04* | (2006.01) |
| *H04N 5/262* | (2006.01) |
| *H04N 7/18* | (2006.01) |

(52) U.S. Cl.
CPC ............... *B60R 1/04* (2013.01); *B60R 11/04* (2013.01); *H04N 5/262* (2013.01); *H04N 5/2628* (2013.01); *H04N 7/18* (2013.01); *H04N 7/181* (2013.01)

(58) Field of Classification Search
CPC ........... B60R 1/04; B60R 11/04; H04N 5/262; H04N 7/18
USPC ......................................................... 348/135
See application file for complete search history.

(56) References Cited

U.S. PATENT DOCUMENTS

2019/0122387 A1* 4/2019 Eom ..................... G06T 7/80

FOREIGN PATENT DOCUMENTS

| | | | |
|---|---|---|---|
| JP | 2010-095086 A | 4/2010 | |
| JP | 2008-266545 | * 10/2015 | ............. B60R 21/00 |

* cited by examiner

*Primary Examiner* — Patricia I Young
(74) *Attorney, Agent, or Firm* — Rabin & Berdo, P.C.

(57) ABSTRACT

An image processing device includes a data capture unit configured to capture image data obtained around a vehicle, and an image processor configured to apply image processing to a display image based on the image data. The display image is constituted of an n×m number of pixels arranged in a matrix on a display screen having first to n-th horizontal lines (n is an integer of 3 or more) extending in a horizontal direction and first to m-th perpendicular lines (m is an integer of 3 or more) extending in a perpendicular direction. The display image includes a first image area constituted of the pixels in the first to (k−1)th horizontal lines (k is an integer satisfying 2≤k<n), and a second image area constituted of the pixels in the k-th to n-th horizontal lines. The image processor applies image compression processing to the second image area.

10 Claims, 3 Drawing Sheets

IMAGE PROCESSING DEVICE

BACKGROUND OF THE INVENTION

1. Field of the Invention

The present invention relates to an image processing device.

2. Description of the Related Art

In recent years, in order to view the rear of vehicles, video images captured by cameras installed in the rear and sides of the vehicles are displayed in an electron mirror, instead of using a rearview mirror and side mirrors. At this time, since a display inside the vehicle has a limited display area, simply displaying the video images captured by the cameras produces blind spots. Extending the video displaying area, to eliminate the blind spots, makes displayed images small and therefore causes deterioration in visibility. Accordingly, vehicle display devices that display rear and side video images of vehicles after being subjected to division, compression, and synthesis are proposed (for example, Patent Literature 1: Japanese Patent Application Laid-Open No. 2010-95086).

In the vehicle display device according to the conventional technology, video images captured by a rear camera, a right side camera, and a left side camera are synthesized after being divided and compressed, or video images captured by a wide angle camera are compressed in whole, to display the video images. Thus, there is a problem that the synthesis of the video images captured by the different cameras causes flicker in the vicinities of the borders between the images, and this results in degradation in visibility. When the video images captured by the wide angle camera are compressed, there is a problem that the video images are compressed in whole in the vicinities of sharp curves, steep slopes, and the like, and this results in deterioration in visibility.

In view of the above-described problems, the present invention aims at providing an image processing device that can convert images around a vehicle into a display image having high visibility.

SUMMARY OF THE INVENTION

An image processing device according to the present invention includes a data capture unit configured to obtain image data captured around a vehicle, and an image processor configured to apply image processing to a display image based on the image data. The display image is constituted of an n×m number of pixels arranged in a matrix on a display screen having first to n-th horizontal lines (n is an integer of 3 or more) extending in a horizontal direction and first to m-th perpendicular lines (m is an integer of 3 or more) extending in a perpendicular direction. The display image includes a first image area constituted of the pixels in the first to (k−1)th horizontal lines (k is an integer satisfying 2≤k<n), and a second image area constituted of the pixels in the k-th to n-th horizontal lines. The image processor applies image compression processing to the second image area.

The image processing device according to the present invention can display images captured around the vehicle in a state of high visibility, irrespective of a road state such as a curve and a slope.

DETAILED DESCRIPTION OF THE INVENTION

Figure 1:
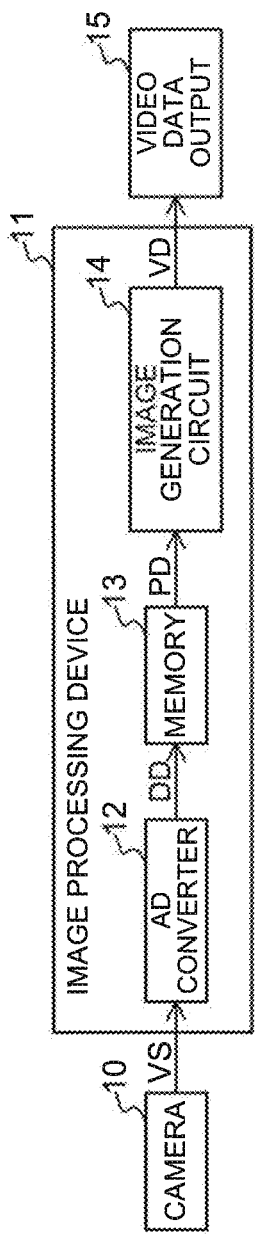
FIG. 1 is a block diagram showing a configuration of an imaging device including an image processing device according to an embodiment.

Embodiments of the present invention will be described below with reference to the drawings. In the following description of the embodiments and the accompanying drawings, the same reference numerals indicate substantially the same or equivalent components.

FIG. 1 is a block diagram showing a schematic configuration of an imaging device 100 including an image processing device 11 according to the embodiment. The imaging device 100 is constituted of a camera 10, the image processing device 11, and a video data output device 15. The image processing device 11 includes an LSI (large scale integration) having an AD (analog-to-digital) converter 12, a memory 13, and an image generation circuit 14.

The camera 10 includes at least one vehicle-mounted camera that is mounted in a vehicle, for example a car or the like, and secured at a predetermined installation position to obtain video images around the vehicle. The camera 10 obtains the video images around the vehicle, and supplies the obtained analog video signal VS to the AD converter 12.

The AD converter 12 converts the analog video signal VS supplied from the camera 10 into digital data DD, and supplies the digital data DD to the memory 13.

The memory 13 stores the digital data DD converted by the AD converter 12. The digital data DD is constituted of a series of frames of image data PD.

The image generation circuit 14 reads the image data PD stored in the memory 13 on a frame-by-frame basis by specifying addresses. At this time, when the address is not an integer value, the image generation circuit 14 performs interpolation of pixels of a display image based on the image data PD, by an interpolation method, for example a bilinear method, a bicubic method, or the like. The image generation circuit 14 applies image compression processing to the display images based on the image data PD read on a frame-by-frame basis, to generate video data VD, and supplies the video data VD to the video data output device 15.

The image generation circuit 14 applies image compression processing to a part of an image area that includes an imaged area in the vicinity of the vehicle of the display image. In the image compression processing, for example, pixel data is decimated.

The image generation circuit 14 performs image compression processing (hereinafter referred to as perpendicular compression processing) to compress the image in a perpendicular direction, and image compression processing (hereinafter referred to as horizontal compression processing) to compress the image in a horizontal direction. When a vehicle speed is a predetermined value (for example, 40 km/h) or less, the image generation circuit 14 performs only the perpendicular compression processing. When the vehicle speed exceeds the predetermined value, the image generation circuit 14 performs both of the perpendicular compression processing and the horizontal compression processing.

Figure 2B:
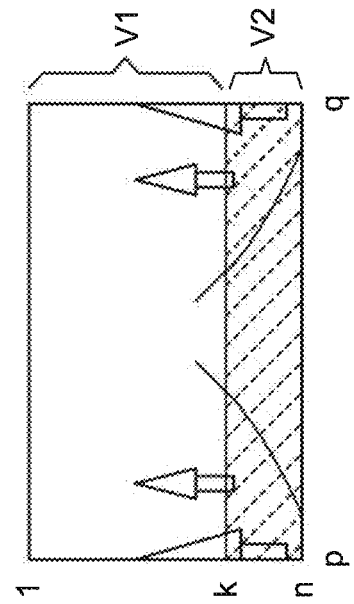
FIGS. 2A and 2B are drawings illustrating images before and after being subjected to perpendicular compression processing, respectively.
Figure 2A:
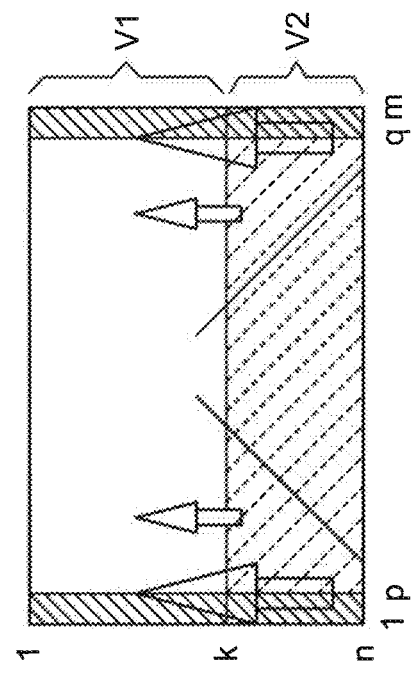

FIGS. 2A and 2B are drawings of examples of display images subjected to the perpendicular compression processing, when the vehicle speed is the predetermined value or less. FIG. 2A shows a display image before being subjected to the perpendicular compression processing, while FIG. 2B shows a display image after being subjected to the perpendicular compression processing.

As shown in FIG. 2A, the display image is constituted of an n×m number of pixels arranged in a matrix on a display screen having first to n-th horizontal lines and first to m-th perpendicular lines (n and m are each an integer of 3 or more). The display image includes a first image area V1 constituted of the pixels in the first to (k−1)th horizontal lines (k is an integer satisfying 2<k<n), and a second image area V2 constituted of the pixels in the k-th to n-th horizontal lines. The second image area V2 corresponds to a display area to display a position near the vehicle, while the first image area V1 corresponds to a display area to display a position farther from the vehicle than the second image area V2.

The image generation circuit 14 designates, in each of the first image area V1 and the second image area V2, an area constituted of the pixels in the first to (p−1)th perpendicular lines and an area constituted of the pixels in the (q+1)th to m-th perpendicular lines (p and q are each an integer satisfying 1<(p−1)<(q+1)<m) as non-display or hidden areas (shaded by solid oblique lines in FIG. 2A).

The image generation circuit 14 applies the perpendicular compression processing to an area (shaded by broken oblique lines in FIGS. 2A and 2B) constituted of the pixels in the p-th to q-th perpendicular lines in the second image area V2. At this time, the image generation circuit 14 performs the perpendicular compression processing by designating the k-th horizontal line as a start line (start point), so as to increase a compression ratio in accordance with an increase in a distance from the start line in the perpendicular direction. For example, the image generation circuit 14 performs the perpendicular compression processing at a compression ratio that is proportional to the square of the distance from the start line in the perpendicular direction. Accordingly, as shown in FIG. 2B, the image of the second image area V2 is compressed in the perpendicular direction and displayed in a reduced size.

Figure 3B:
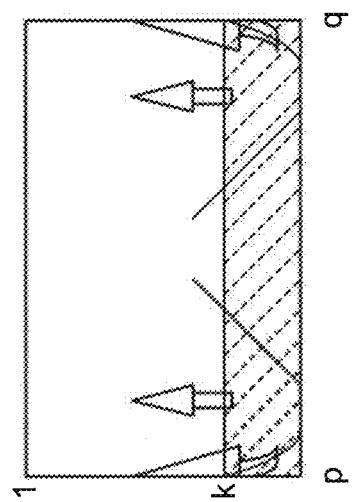
FIGS. 3A and 3B are drawings illustrating images before and after being subjected to the perpendicular compression processing and horizontal compression processing, respectively.
Figure 3A:
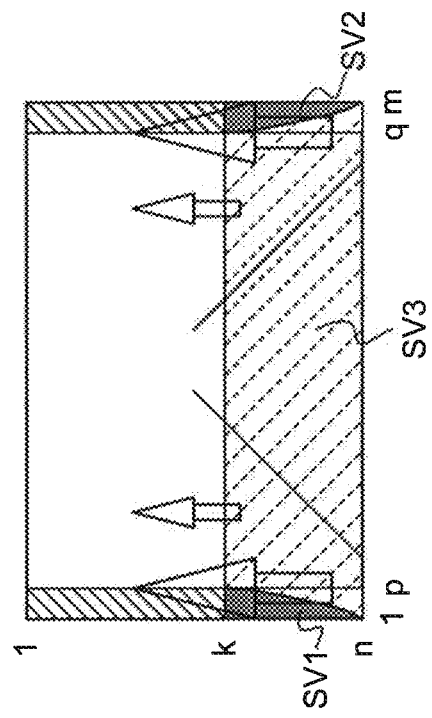

FIGS. 3A and 3B are drawings of examples illustrating display images subjected to the perpendicular compression processing and the horizontal compression processing, when the vehicle speed exceeds the predetermined value. FIG. 3A shows a display image before being subjected to the perpendicular compression processing and the horizontal compression processing, while FIG. 3B shows a display image after being subjected to the perpendicular compression processing and the horizontal compression processing.

As shown in FIG. 3A, the second image area V2 includes a first subarea SV1 and a second subarea SV2 (gray shaded in FIG. 3A), and a third subarea SV3 (shaded by broken oblique lines in FIGS. 3A and 3B).

The first subarea SV1 is an image area between the first perpendicular line and the p-th perpendicular line and between the k-th horizontal line and the n-th horizontal area. The first subarea SV1 includes the pixels in the first perpendicular line and the k-th to n-th horizontal lines, and the pixels in the k-th horizontal line and the first to p-th perpendicular lines. The width of the first subarea SV1 in the horizontal direction is narrowed in shape as approaching the n-th horizontal line from the k-th horizontal line.

The second subarea SV2 is an image area between the q-th perpendicular line and the m-th perpendicular line and between the k-th horizontal line and the n-th horizontal area. The second subarea SV2 includes the pixels in the m-th perpendicular line and the k-th to n-th horizontal lines, and the pixels in the k-th horizontal line and the q-th to m-th perpendicular lines. The width of the second subarea SV2 in the horizontal direction is narrowed in shape as approaching the n-th horizontal line from the k-th horizontal line.

The third subarea SV3 is an image area between the first subarea SV1 and the second subarea SV2. The third subarea SV3 is subjected to the perpendicular compression processing and the horizontal compression processing by the image generation circuit 14.

The image generation circuit 14 designates an area constituted of the pixels in the first to (p−1) perpendicular lines in the first image area V1 and an area constituted of the pixels in the (q+1)th to m-th perpendicular lines in the first image area V1 as hidden areas. The image generation circuit 14 designates the first subarea SV1 and the second subarea SV2 in the second image area V2 as hidden areas.

The image generation circuit 14 applies the perpendicular compression processing and the horizontal compression processing to the third subarea SV3 of the second image area V2. At this time, the image generation circuit 14 performs the perpendicular compression processing and the horizontal compression processing by designating the k-th horizontal line as a start line (start point), so as to increase a compression ratio in accordance with an increase in a distance from the start line in the perpendicular direction. The image generation circuit 14 performs the horizontal compression processing such that the border between the first subarea SV1 and the third subarea SV3 is situated in an extension of the p-th perpendicular line in the first image area V1, and the border between the second subarea SV2 and the third subarea SV3 is situated in an extension of the q-th perpendicular line in the first image area V1. Accordingly, as shown in FIG. 3B, the image of the third subarea SV3 is compressed in the perpendicular direction and the horizontal direction, and displayed in a reduced size.

When Kv represents a compression coefficient in the perpendicular compression processing, and Vx represents a distance from the start line, a compression ratio Vy in the perpendicular compression processing is represented by the following equation (1):

$$Vy = Kv * Vx^2 \qquad (1)$$

When Kh represents a compression coefficient in the horizontal compression processing, and Hx represents a distance from the start line, a compression ratio Hy in the horizontal compression processing is represented by the following equation (2):

$$Hy = Kh * Hx^2 \qquad (2)$$

The compression coefficient Kv of the perpendicular compression processing is constant irrespective of the vehicle speed, while the compression coefficient Kh of the horizontal compression processing varies in accordance with the vehicle speed.

Figure 4A:
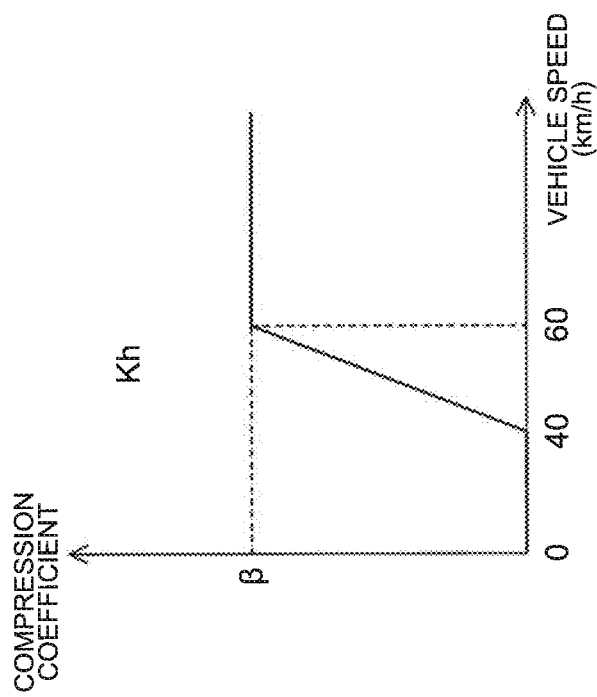
FIG. 4A is a graph of the relationship between a compression coefficient of the perpendicular compression processing and a vehicle speed.

FIG. 4A is a graph of the relationship between the compression coefficient Kv of the perpendicular compression processing and the vehicle speed. The compression coefficient Kv satisfies Kv=α (constant), irrespective of the vehicle speed.

Figure 4B:
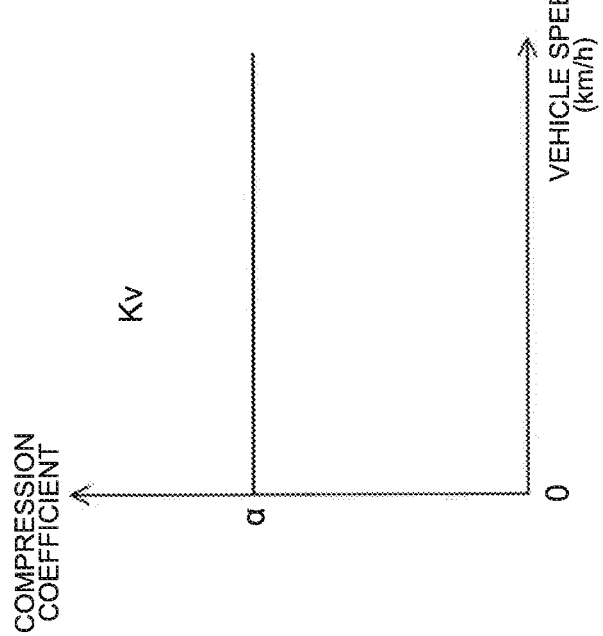
FIG. 4B is a graph of the relationship between a compression coefficient of the horizontal compression processing and a vehicle speed.

FIG. 4B is a graph of the relationship between the compression coefficient Kh of the horizontal compression processing and the vehicle speed. When the vehicle speed is between 0 and 40 km/h, for example, the compression coefficient Kh is 0. When the vehicle speed is between 40 and 60 km/h, the compression coefficient varies proportionally with the vehicle speed (according to a linear function depending on the vehicle speed). When the vehicle speed exceeds 60 km/h, Kh=β (constant) holds true.

As described above, the image processing device 11 according to this embodiment applies the image compression processing to a part of the image area (second image area V2) of the display image obtained around the vehicle, and can thereby output the wide field camera image without increasing a screen size.

The image processing device 11 according to this embodiment does not apply the image compression processing to the first image area V1 constituted of the pixels in the first to (k−1)th horizontal lines of the display image obtained around the vehicle, while the image processing device 11 applies the image compression processing to the second image area V2 constituted of the pixels in the k-th to n-th horizontal lines thereof. This configuration can reduce a feeling of strangeness caused by the image compression as compared with the case of applying the image compression processing to the entire image. For example, in this embodiment, the second image area V2 corresponds to the display area in the position near the vehicle, while the first image area V1 corresponds to the display area in the position far from the vehicle. Since the image area in the position relatively far from the vehicle is not compressed, it is possible to prevent deterioration in visibility in sharp curves, steep slopes, and the like.

When the vehicle moves at a high speed, if the image compression processing is performed only in the perpendicular direction, a compressed portion seems wide, and may give a feeling of strangeness to a driver and the like who see the wide compressed portion. However, the image processing device 11 according to this embodiment performs not only the perpendicular compression processing but also the horizontal compression processing, when the vehicle speed exceeds the predetermined value (for example, 40 km/h). Therefore, it is possible to prevent the occurrence of phenomenon in which the image seems wide owing to the compression in the perpendicular direction, and hence reduce the feeling of strangeness of the driver and the like.

The image processing device 11 according to this embodiment performs only the perpendicular compression processing, without performing the horizontal compression processing, when the vehicle speed is the predetermined value or less. Therefore, it is possible to reduce a feeling of strangeness of the driver and the like caused by compressing the image in the horizontal direction, when the vehicle is stopping.

The image processing device 11 according to this embodiment performs the image compression processing, while stepwise varying the compression coefficient Kh in the horizontal direction in accordance with the vehicle speed. Therefore, it is possible to reduce a feeling of strangeness of the driver and the like caused by a sudden change of the compression coefficient.

The present invention is not limited to the above-described embodiment. In the above-described embodiment, for example, the compression ratio is proportional to the square of the distance from the start line. However, the relationship between the compression ratio and the distance from the start line is not limited to this, as long as the compression ratio increases with an increase in the distance from the start line.

The compression coefficient in the horizontal compression processing is not limited to that of FIG. 4B, as long as the compression coefficient varies depending on the vehicle speed.

This application is based on a Japanese Patent Application No. 2017-142768 which is hereby incorporated by reference.

What is claimed is:

1. An image processing device comprising:
   a data capture unit configured to capture image data obtained around a vehicle; and
   an image processor configured to apply image processing to a display image based on said image data, wherein
   said display image is constituted of an n×m number of pixels arranged in a matrix on a display screen having first to n-th horizontal lines (n is an integer of 3 or more) extending in a horizontal direction and first to m-th perpendicular lines (m is an integer of 3 or more) extending in a perpendicular direction,
   said display image includes a first image area constituted of the pixels in the first to (k−1)th horizontal lines (k is an integer satisfying 2≤k<n), and a second image area constituted of the pixels in the k-th to n-th horizontal lines, and
   said image processor applies image compression processing to said second image area so as to reduce a size of said second image area.

2. The image processing device according to claim 1, wherein
   said second image area corresponds to an imaged area in a vicinity of said vehicle; and
   said first image area corresponds to an imaged area farther from said vehicle than the imaged area corresponding to said second image area.

3. The image processing device according to claim 1, wherein said image processor performs perpendicular compression processing in which an image is compressed in a direction perpendicular to said k-th to n-th horizontal lines, as said image compression processing.

4. The image processing device according to claim 3, wherein said image processor performs said perpendicular compression processing at a different compression ratio in accordance with a distance from said k-th horizontal line.

5. The image processing device according to claim 3, wherein said image processor performs horizontal compression processing in which an image is compressed in a direction parallel to said k-th to n-th horizontal lines, as said image compression processing.

6. The image processing device according to claim 5, wherein said image processor performs said horizontal compression processing at a different compression ratio in accordance with a distance from said k-th horizontal line.

7. The image processing device according to claim 5, wherein said image processor varies a compression ratio of said horizontal compression processing in accordance with a speed of said vehicle.

8. The image processing device according to claim 1, wherein
   said second image area includes a first subarea containing the pixels in said first perpendicular line, a second subarea containing the pixels in said m-th perpendicular line, and a third subarea between said first subarea and said second subarea; and said image processor applies said image compression processing to said third subarea.

9. The image processing device according to claim 8, wherein said image processor designates an area containing the pixels in the first to (p−1)th perpendicular lines and an area containing the pixels in the (q+1)th to m-th perpendicular lines (p and q are each an integer satisfying $1<(p-1)<(q+1)<m$) of said first image area as hidden areas; and said image processor applies said image compression processing to said third subarea such that a border between said third subarea and said first subarea overlaps with said p-th perpendicular line and such that a border between said third subarea and said second subarea overlaps with said q-th perpendicular line, and said image processor designates said first subarea and said second subarea as hidden areas.

10. The image processing device according to claim 1, wherein an image is displayed on the basis of said image data in the first image area.

* * * * *